(12) United States Patent
Ishi

(10) Patent No.: US 6,445,550 B1
(45) Date of Patent: Sep. 3, 2002

(54) METHOD OF MANUFACTURING MAGNETORESISTIVE/INDUCTIVE COMPOSITE HEAD AND MAGNETORESISTIVE/INDUCTIVE COMPOSITE HEAD

(75) Inventor: Tsutomu Ishi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/438,059

(22) Filed: Nov. 10, 1999

(30) Foreign Application Priority Data

Nov. 12, 1998 (JP) .......................................... 10-321822

(51) Int. Cl.⁷ ................................................ G11B 5/31
(52) U.S. Cl. ........................ 360/317; 29/603.15; 216/66
(58) Field of Search .................................. 360/125, 126, 360/317; 204/192.34, 192.33, 192.32; 216/22, 66; 438/3; 29/603.07, 603.1, 603.13, 603.14, 603.15, 603.16, 603.18

(56) References Cited

U.S. PATENT DOCUMENTS

| 5,438,747 | A | * | 8/1995 | Krounbi et al. ............... 29/603 |
| 5,452,164 | A | * | 9/1995 | Cole et al. ................... 360/126 |
| 5,751,526 | A | * | 5/1998 | Schemmel .................... 360/317 |
| 5,943,763 | A | * | 8/1999 | Shouji et al. ............. 29/603.14 |
| 5,996,213 | A | * | 12/1999 | Shen et al. .............. 29/603.15 |
| 6,199,267 | B1 | * | 3/2001 | Koshikawa et al. ..... 29/603.15 |

FOREIGN PATENT DOCUMENTS

| JP | 7-262519 | | 10/1995 |
| JP | 08-315319 | * | 11/1996 |
| JP | 9-167316 | | 6/1997 |

* cited by examiner

Primary Examiner—David L. Ometz
(74) Attorney, Agent, or Firm—McGinn & Gibb, PLLC

(57) ABSTRACT

In a magnetoresistive/inductive composite head including: a magnetoresistive head which comprises a magnetoresistive element for sensing magnetic field occurring above a magnetic recording medium and an electrode portion for supplying sense current to the magnetoresistive element, the magnetoresistive element and the electrode portion being disposed between a pair of first and second magnetic shields disposed so as to confront each other through magnetic gaps; and an inductive head which comprises a first magnetic pole using the second magnetic shield as a magnetic pole, a second magnetic pole disposed at the opposite side to the magnetoresistive element with respect to the second magnetic shield and a coil for exciting the first magnetic pole and the second magnetic pole, wherein the writing of information is performed on the magnetic recording medium by magnetic field occurring from a writing magnetic gap provided between the first magnetic pole and the second magnetic pole; and a recess potion for defining the width of each of the first magnetic pole and the second magnetic pole, the recess portion being formed on the surface of the second magnetic shield which confronts the magnetic recording medium, wherein the end potion of the recess portion and the end portion of the electrode portion are in a predetermined positional relationship with each other.

14 Claims, 5 Drawing Sheets

FIG. 1 (PRIOR ART)
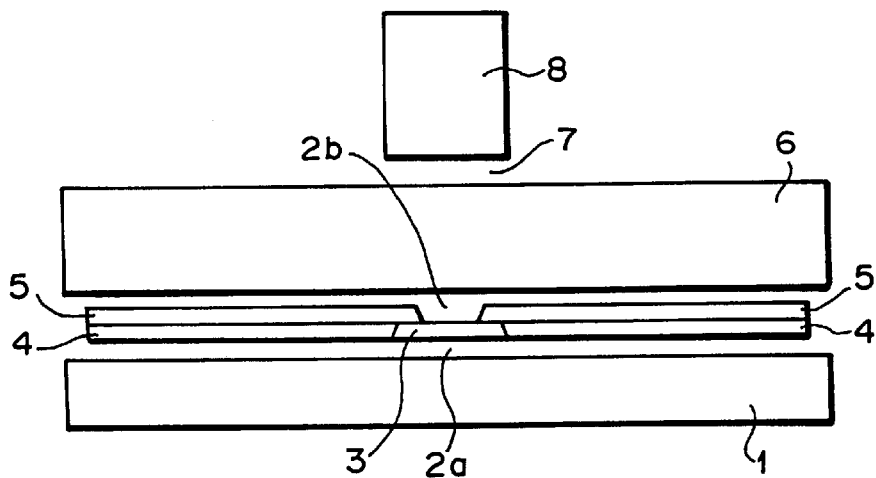
FIG. 2 (PRIOR ART)
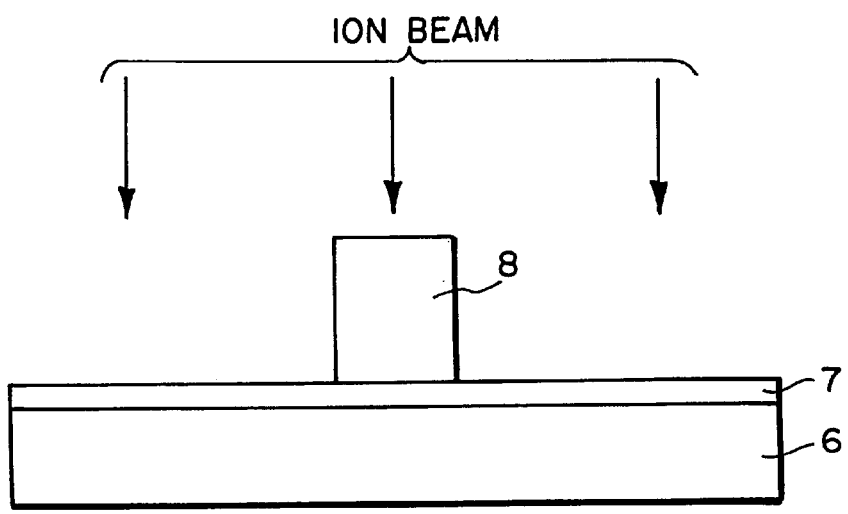
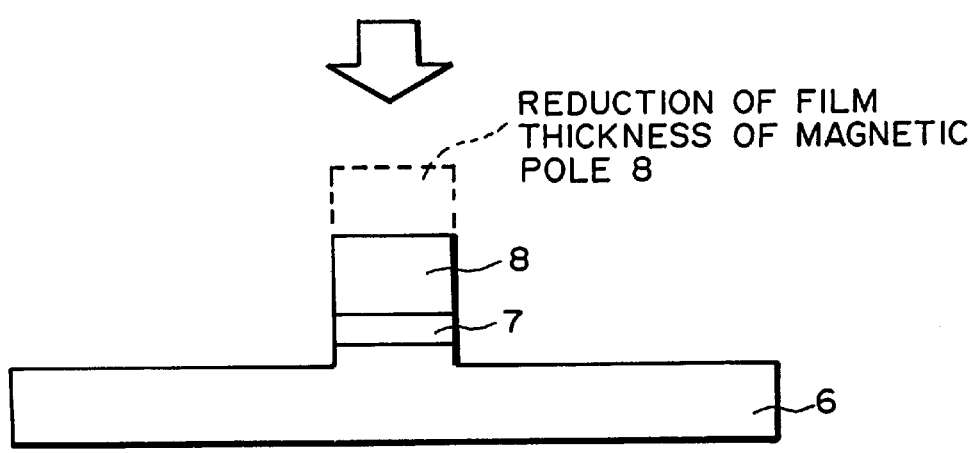
REDUCTION OF FILM THICKNESS OF MAGNETIC POLE 8

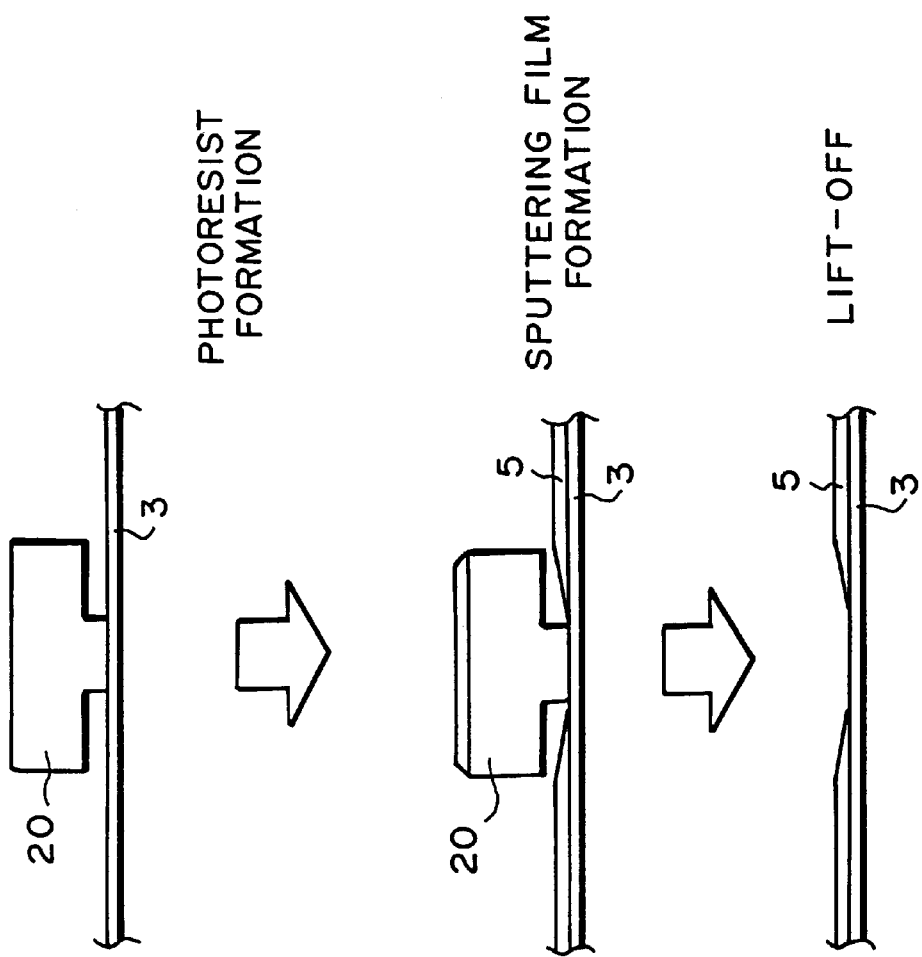
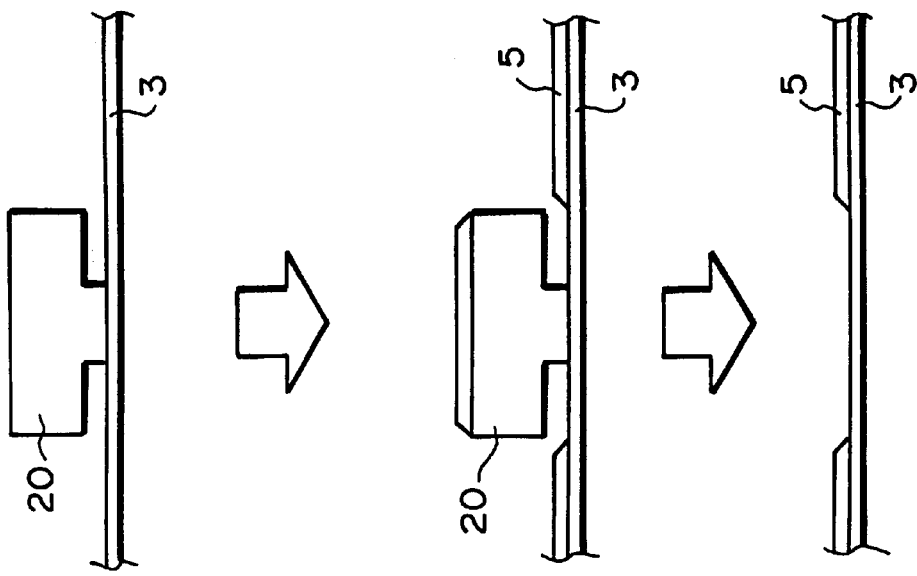

BEFORE MAGNETIC POLE WIDTH IS SETTLED

BEFORE ELECTRODE PORTION IS RECOGNIZED

PROCESSING BOX IS DISPOSED

MAGNETIC POLE WIDTH SETTLING AND PROCESSING

METHOD OF MANUFACTURING MAGNETORESISTIVE/INDUCTIVE COMPOSITE HEAD AND MAGNETORESISTIVE/INDUCTIVE COMPOSITE HEAD

BACKGROUND OF THE INVENTION

1. Field of the Invention

The present invention relates to a method of manufacturing a magnetoresistive/inductive composite head and a magnetoresistive/inductive composite head, and particularly, to a method of manufacturing a magnetoresistive/inductive composite head and a magnetoresistive/inductive composite head which can form a recording head more precisely to a reading head.

2. Description of the Prior Art

Magnetoresistive heads using a magnetoresistive effect have attracted much public attention as a key device for promoting miniaturization of recent hard magnetic disk devices and increase of the memory capacity thereof, and of these heads, a magnetoresistive head using such a spin valve effect that the resistance change corresponds to the cosine between magnetization directions of two adjacent magnetic layers is being actively developed because it exhibits a large resistance change under application of a small signal magnetic field.

FIG. 1 shows the most practical structure of this head. As shown in FIG. 1, there has been known a magnetoresistive/inductive composite head including a magnetoresistive head and an inductive head.

The magnetoresistive head includes a pair of confronting magnetic shields 1 and 6 and magnetoresistive element 3 that is disposed in the gap between the magnetic shields 1 and 6. The magnetoresistive element 3 senses magnetic field occurring above a magnetic recording medium. The magnetic shields 1 and 6 and the magnetoresistive element 3 are disposed through reading magnetic gaps 2a and 2b.

The inductive head includes the magnetic shield 6 serving as one magnetic pole (hereinafter, number 6 is indicated as a magnetic shield or a magnetic pole), another magnetic pole 8 disposed at the opposite side to the magnetoresistive element 3 with respect to the magnetic pole 6, a coil (not shown) for exciting the magnetic poles 6 and 8. The inductive head writes information on a magnetic recording medium by magnetic field occurring from writing magnetic gap 7 provided between the magnetic poles 6 and 8.

It has been known that a side fringe magnetic field that is not negligible occurs for writing information in such a composite type head as described above. The width of magnetic pole 6 which also serves as the magnetic shield is designed to be larger than the width of the magnetic pole 8 which inherently defines the writing width for information, and thus the magnetic flux leaks to the extra portion of the magnetic pole 6 which is beyond the magnetic pole 8 in width, resulting in occurrence of the side fringe magnetic field. The side fringe magnetic field thus occurring restricts the minimum writing width achievable. Therefore, in order to achieve a higher recording density, the composite type head must be designed so as to reduce the side fringe magnetic field at maximum. A method of reducing the side fringe magnetic field has been disclosed in Japanese Laid-open Patent Publication No. 7-262519.

According to the method disclosed in the publication, as shown in FIG. 2, the magnetic pole 6 is etched until a proper depth by an ion beam milling while the magnetic pole 8 is used as a mask so that the adjacent portion of the magnetic pole 6 to the writing gap 7 is cut so as to be identically with the magnetic pole 8 in width, thereby suppressing the side fringe magnetic field. However, with this method, the magnetic pole 8 is etched simultaneously with the etching process of the magnetic pole 6 as shown in FIG. 2, resulting in remarkable reduction of the film thickness of the magnetic pole 8. The reduction of the film thickness of the magnetic pole 8 may induce degradation of the writing characteristic due to a magnetic saturation phenomenon of the magnetic pole, etc. Accordingly, in order to finally obtain the magnetic pole 8 having a film thickness enough to a desired writing characteristic, the magnetic pole 8 is formed so as to have an extra film thickness by a flame plating method while the reduction amount of the film thickness is estimated in advance for the magnetic pole 8. That is, in order to achieve the above object, the frame height must be set to a large value. If the frame height is kept large, it would generally disturb reduction of the frame interval, that is, reduction of the writing width. In Japanese Laid-open Patent Publication No. 7-262519, the upper limit of the reduction of the writing width based on this method is equal to $2 \mu m$, and it is difficult to obtain a writing width less than $2 \mu m$.

Japanese Laid-open Patent Publication No. 5-143927 discloses a method of solving the above problem. According to this method, the writing width is specified by an ion beam etching from the confronting face side to the medium in a bar processing step after a wafer step is completed. In this method, a desired writing width can be achieved independently of the thickness of the magnetic pole 8, and thus there can be easily obtained such a structure that both of the reduction of the writing width and the reduction of the side fringe magnetic field can be achieved.

It has been increasingly required to strictly manage the relative positional relationship between the writing track position of the inductive head for performing an information writing operation and the reading track position of the magnetoresistive head for performing an information reading operation. This requirement is made to perform an ideal information reading/writing operation in a magnetic disk device, and the management of the positional relationship is more increasingly required to be performed with precision of $0.1 \mu m$ particularly as the writing width is reduced to 1 $\mu m$ or less. With respect to this point, Japanese Laid-open Patent Publication No. 5-143927 teaches that a mark indicating the position of the reading track is located at an observable position in a magnetic pole processing step based on the ion beam etching. Furthermore, it discloses as a mark forming method a method of forming a predetermined mark in another step by using a photoresist mask having the same pattern as a photoresist mask used to determine the position of the reading track. However, in this method, the mark forming step and the reading track position determining step are not the same step, and thus a measure of dispersion remains in the alignment between both the photoresist masks even though the photoresist masks have the same pattern. Accordingly, even when the processing step of the writing pole is carried out on the basis of the mark, it cannot directly guarantee the positional relationship between the reading track and the writing track.

SUMMARY OF THE INVENTION

An object of the present invention is to provide a novel method of manufacturing a magnetoresistive/inductive composite head and a magnetoresistive/inductive composite head which can overcome the disadvantage of the prior art and reduce the side fringe magnetic field, and also can strictly manage the positional relationship between a writing track position and a reading track position particularly even under a narrow-width state that the writing width is equal to 1 μm or less.

In order to achieve the above object, according to the present invention, there is provided a method of manufacturing a magnetoresistive/inductive composite head comprising a step of forming a magnetoresistive head which comprises a magnetoresistive element for sensing magnetic field occurring above a magnetic recording medium and an electrode portion for supplying sense current to the magnetoresistive element, the magnetoresistive element and the electrode portion being disposed between a pair of first and second magnetic shields disposed so as to confront each other through magnetic gaps; a step of forming an inductive head which comprises a first magnetic pole using the second magnetic shield as a magnetic pole, a second magnetic pole disposed at the opposite side to the magnetoresistive element with respect to the second magnetic shield and a coil for exciting the first magnetic pole and the second magnetic pole, wherein the writing of information is performed on the magnetic recording medium by magnetic field occurring from a writing magnetic gap provided between the first magnetic pole and the second magnetic pole; and a step of forming a recess potion for defining the width of each of the first magnetic pole and the second magnetic pole is formed on the surface of the second magnetic shield which confronts the magnetic recording medium on the basis of the end portion of the electrode portion.

Furthermore, according to the present invention, there is provided a magnetoresistive/inductive composite head comprising: a magnetoresistive head which comprises a magnetoresistive element for sensing magnetic field occurring above a magnetic recording medium and an electrode portion for supplying sense current to the magnetoresistive element, the magnetoresistive element and the electrode portion being disposed between a pair of first and second magnetic shields disposed so as to confront each other through magnetic gaps; and an inductive head which comprises a first magnetic pole using the second magnetic shield as a magnetic pole, a second magnetic pole disposed at the opposite side to the magnetoresistive element with respect to the second magnetic shield and a coil for exciting the first magnetic pole and the second magnetic pole, wherein the writing of information is performed on the magnetic recording medium by magnetic field occurring from a writing magnetic gap provided between the first magnetic pole and the second magnetic pole; and a recess potion for defining the width of each of the first magnetic pole and the second magnetic pole, the recess portion being formed on the face of the second magnetic shield which confronts the magnetic recording medium, wherein the end potion of the recess portion and the end portion of the electrode portion are in a predetermined positional relationship with each other.

The inventor of this application has earnestly studied and considered to perform the management of the positional relationship between the reading track position and the writing track position with precision of about 0.1 μm in a magnetoresistive/inductive composite head having a narrow writing width of 1 μm or less. As a result, the inventor has found that recognition of the reading track position can be dramatically enhanced by optimizing the material of the electrode potion for supplying the sense current to the magnetoresistive element, thereby enabling the processing step of the writing pole in which the reading track position is directly used as a reference. If any material of Au, Pt, W, Ta is selected as the material of the electrode portion, the intensity of an image recognition signal can be enhanced more greatly than when Cu or the like is selected as the material of the electrode. Furthermore, following the reduction of the reading gap in connection with the enhancement of the recording density, it is necessary to reduce the thickness of the electrode film to about 100 nm or less. However, it has been proved that more sufficient contrast can be obtained for such a thin-layer electrode by selecting one of Au, Pt, W, Ta as the electrode material than when $Al_2O_3$ film or Ni—Fe film serving as a constituent material of the magnetoresistive/inductive composite head which is selected in terms of the processing.

Furthermore, as described in Japanese Laid-open Patent Publication No. 5-143927, the end portion of the electrode potion is generally designed in a taper shape, and thus in such a structure that the reading track position is defined at the end potion of the electrode, it is difficult to recognize the position of the reading track accurately. However, for this structure, the recognition of the reading track position can be dramatically enhanced by optimizing the forming step of the electrode portion, thereby enabling the processing of the writing magnetic pole while the reading track position is directly used as a reference.

FIG. 3 shows two processes for forming the electrode portion in a case where lift-off is carried out after a sputtering film forming step is carried out by using a photoresist mask. More Specifically, (b) of FIG. 3 shows a process when a normal radio-frequency (RF) sputtering method or magnetron sputtering method is used, and (a) of FIG. 3 shows a process when a high particle-directivity sputtering method, specifically, an ion beam sputtering method is used. It has been found that when the ion beam sputtering method is used, intrusion of sputtering particles to the lower side of photoresist mask 20 is suppressed, so that the shape of the end portion of electrode 5 can be accurately fixed, and also the recognition precision of the reading track position can be dramatically enhanced.

BRIEF DESCRIPTION OF THE DRAWINGS

FIG. 1 is a diagram showing a conventional magnetoresistive/inductive composite head comprising a reading magnetoresistive head and a writing inductive head;

FIG. 2 is a diagram showing a method of manufacturing the conventional magnetoresistive/inductive composite head;

FIG. 3 shows processes to form an electrode portion for supplying sense current to a magnetoresistive element, wherein in a process of lift-off after sputtering film formation using a photoresist mask, (a) is a cross-sectional view showing the shape of the end potion of the electrode when a high particle-directivity ion beam sputtering method is used, and (b) is a cross-sectional view showing the shape of the end portion of the electrode when a normal radiofrequency (RF) sputtering method is used;

DETAILED DESCRIPTION OF THE PREFERRED EMBODIMENTS

Preferred embodiments of magnetoresistive/inductive composite head and a method for forming the magnetoresistive/inductive composite head according to the present invention will be described in detail with reference to the accompanying drawings.

Figure 4:
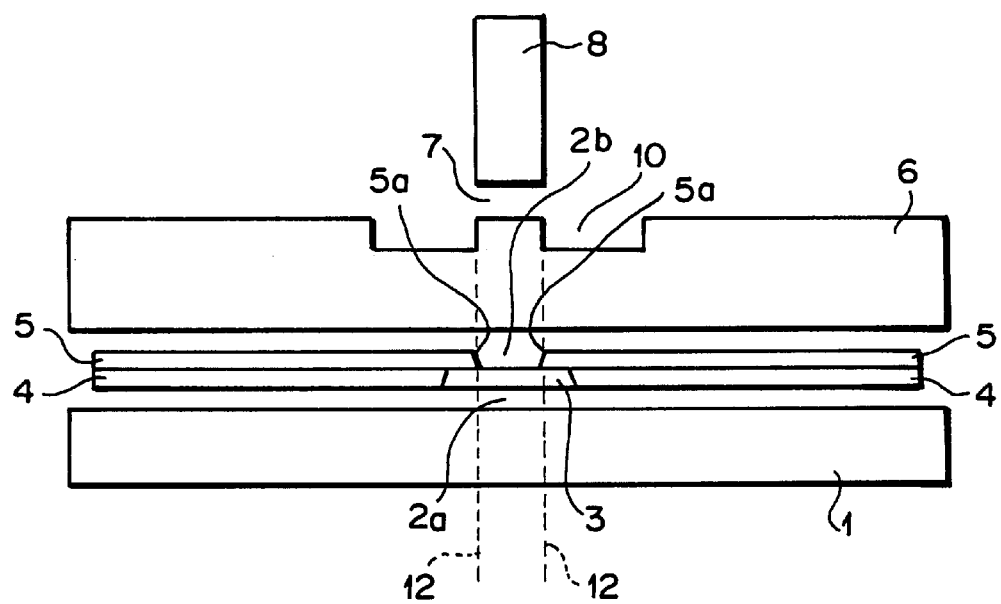
FIG. 4 is a diagram showing the structure of an embodiment of a magnetoresistive/inductive composite head according to the present invention.

FIG. 4 is a diagram showing the structure of an embodiment of the magnetoresistive/inductive composite head according to the present invention. As shown in FIG. 4, the magnetoresistive/inductive composite head includes a magnetoresistive head which comprises the magnetoresistive element 3 for sensing magnetic field occurring above a magnetic recording medium and electrode portion 5 for supplying sense current to the magnetoresistive element 3, the magnetoresistive element 3 and the electrode portion 5 being disposed between a pair of first and second magnetic shields 1 and 6 which are disposed so as to confront each other through magnetic gaps 2a, 2b; and an inductive head which comprises first magnetic pole 6 serving the second magnetic shield as a magnetic pole, second magnetic pole 8 disposed at the opposite side to the magnetoresistive element 3 with respect to the second magnetic shield 6 and a coil for exciting the second magnetic shield 6 as serving a first magnetic pole and the second magnetic pole 8, and writes information on the magnetic recording medium by magnetic field occurring from writing magnetic gap 7 provided between the first magnetic pole 6 and the second magnetic pole 8.

Recess potion 10 for defining the width of the first magnetic pole 6 and the second magnetic pole 8 is formed on the surface of the second magnetic shield 6 that confronts the magnetic recording medium. The recess portion 10 is formed on the basis of the end portion 5a of the electrode portion 5.

Figure 5:
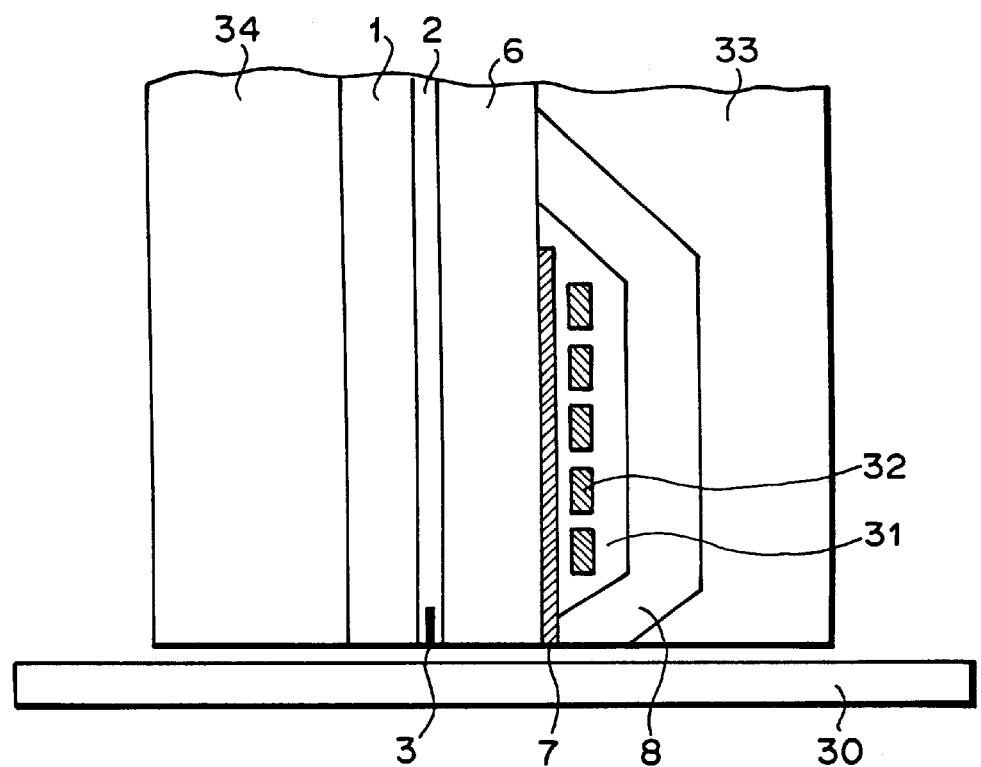
FIG. 5 is cross-sectional view taken along the face vertical to the surface of the magnetic recording medium when it is fabricated as a magnetic disk device.
Figure 6A:
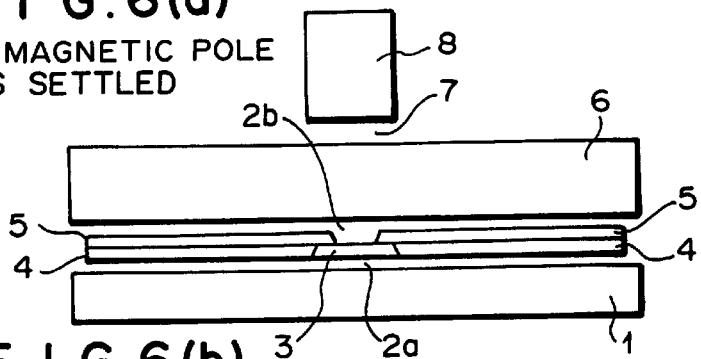
FIG. 6 is a diagram showing the method of manufacturing the magnetoresistive/inductive composite head according to the embodiment of the present invention, wherein (a) to (d) are cross-sectional views taken along the face parallel to the surface of a magnetic recording medium when it is fabricated as a magnetic disk device.
Figure 6B:
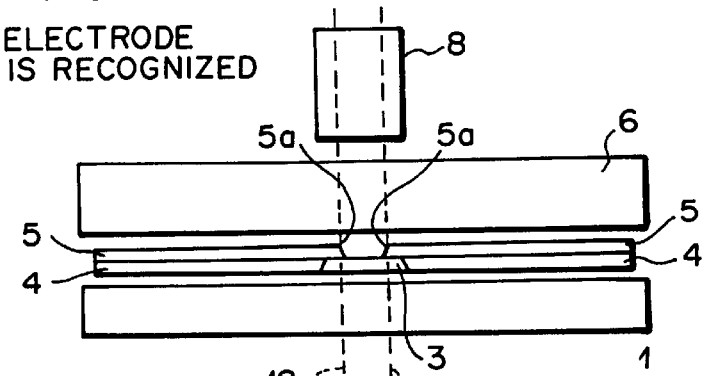
Figure 6C:
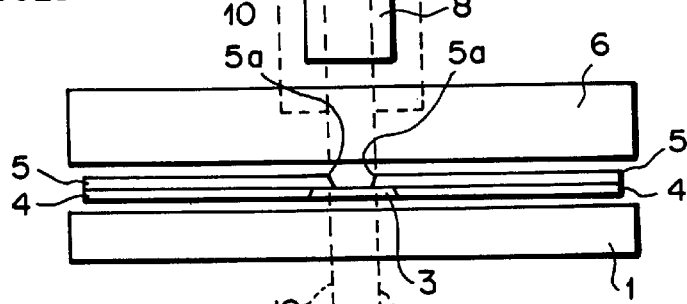
Figure 6D:
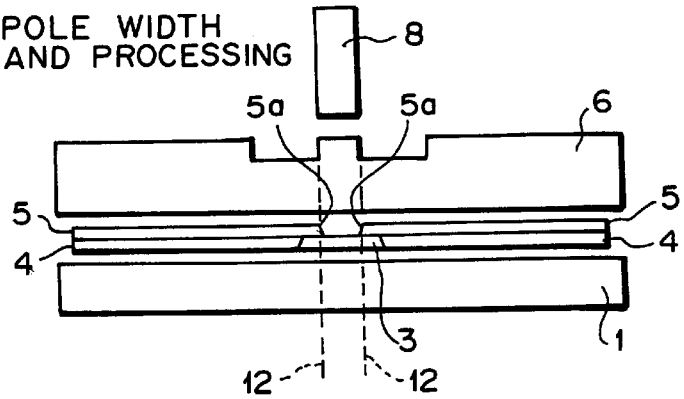

FIG. 5 is cross-sectional view taken along the face vertical to the surface of the magnetic recording medium when it is fabricated as a magnetic disk device. As shown in FIG. 5, the magnetoresistive/inductive composite head is arranged above magnetic recording medium 30. The magnetic shield 1 is formed on slider substrate 34. Coil 32 for exciting the first magnetic pole 6 and the second magnetic pole 8 is embedded in coil insulating portion 31 and overcoat 33 is formed on the coil insulating portion 31.

FIG. 6 shows a process of manufacturing the magnetoresistive/inductive composite head of an embodiment of the present invention, and (a) to (d) of FIG. 6 are cross-sectional views taken along the face parallel to the surface of the magnetic recording medium when it is fabricated as a magnetic disk device.

The magnetoresistive head having a reading function includes the magnetoresistive element 3 comprising a spin valve element, electrode portion 5 which is adjacent to the magnetoresistive element 3 and supplies sense current to the magnetoresistive element 3, and a pair of magnetic shields 1 and 6 which are formed so as to sandwich the magnetoresistive element 3 and the electrode portion 5 therebetween through reading gaps 2a and 2b. In this case, the magnetoresistive head is further provided with bias magnetic field applying potion 4 for applying bias magnetic field to perform magnetic domain control of the magnetoresistive element 3. Further, the magnetic shield 6 is used as one writing magnetic pole, writing gap 7 is formed on the writing magnetic pole 6 and the other writing pole 8 is formed on the writing gap 7, thereby fabricating an inductive head having a writing function. An overcoat (not shown) for protecting the overall inductive head is further provided on the inductive head thus constructed.

In FIG. 6, the exciting coil is omitted from the illustration.

Next, the process of actually manufacturing the magnetoresistive head will be described with reference to FIG. 6.

First, the magnetoresistive head having the reading function using the spin valve effect will be described. An $Al_2O_8$—TiC substrate is used as a substrate (not shown) which will be processed into a slider shape in the last step, and a Co—Zr—Ta film is formed at a thickness of 1 $\mu$m on the substrate by the sputtering method. Thereafter, as an initial heat treatment, the resultant substrate thus obtained is subjected to a heat treatment of 350° C. for 1 hour while static magnetic field is applied in a track width direction of a finally-fabricated magnetic recording device. The intermediate thus heat-treated is subjected to a patterning treatment to form the magnetic shield 1, and then an $Al_2O_3$ film which will serve as the reading gap 2a is formed at a thickness of 0.05 $\mu$m by the sputtering method. Subsequently, films of Zr, Pt—Mn, CoFe, Cu, Co—Fe, Ni—Fe and Zr are formed in this order from the side of the magnetic shield 1 by the sputtering method to form a spin valve laminate layer. The thickness of each film of the spin valve laminate layer is set to 3 nm, 25 nm, 4 nm, 2.5 nm, 1 nm, 7 nm and 3 nm for the Zr, Pt—Mn, CoFe, Cu, Co—Fe, Ni—Fe and Zr films, respectively.

After the film forming step, in order to settle the magnetization direction of the spin valve laminate layer, a heat treatment is carried out on the spin valve laminate layer at 250° C. for 5 hours under static magnetic field in a direction perpendicular to that of the initial heat treatment for the magnetic shield 1. Then, the resultant intermediate is patterned into a predetermined shape to form the magnetoresistive element portion 3. A Co—Cr—Pt film of 20 nm in thickness is formed as a permanent magneto film constituting the bias magnetic field applying portion 4 for applying bias magnetic field to perform magnetic domain control on the magnetoresistive element portion 3, and an Au film of 50 nm in thickness is formed as the electrode portion 5 for supplying sense current to the magnetoresistive element portion 3. The Co—Cr—Pt film and the Au film are formed by the sputtering method, and these films are processed to have predetermined shapes. Particularly, the Au film is formed by the ion beam sputtering method because much attention is paid to the accurate settlement of the shape of the end portion. Subsequently, an $Al_2O_3$ film serving as the reading gap 2b is formed at a thickness of 0.07 $\mu$m by the sputtering method. Thereafter, an Ni—Fe film serving as the magnetic shield 6 is formed at a thickness of 2 $\mu$m by the flame plating method.

Next, a method of manufacturing the inductive head having the writing function will be described.

After the above step, an $Al_2O_3$ film serving as the writing gap 7 is formed at a thickness of 0.2 $\mu$m by the sputtering method. Subsequently, a coil portion (not shown) for exciting the writing magnetic pole is formed. Specifically, a coil insulating portion of a hard cure photoresist, a Cu coil portion based on the flame plating method and a coil insulating portion of a hard cure photoresist are formed in this order so that the Cu coil portion is embedded in the hard cure photoresist. In this case, a heat treatment of 230° C. for 1 hour is carried out to hard-cure the photoresist.

Subsequently, a Co—Ni—Fe film serving as the writing magnetic pole 8 is formed at a thickness of 3 μm by the flame plating method. Thereafter, in order to settle the magnetization direction of the magnetic poles 6 and 8, a heat treatment of 200° C. for 1 hour is carried out under static magnetic field in the track width direction when it is fabricated as the magnetic recording device. Finally, an overcoat (not shown) of an $Al_2O$ film is formed so as to cover the whole body.

After the above wafer step is completed, a step of cutting out the wafer in a bar shape and a step of polishing the surface of the bar-shaped wafer which confronts the magnetic recording medium are successively carried out, and then the recess portion 10 for defining the width of the writing magnetic pole 8 exposed to the medium-confronting surface is formed. The shape of the recess portion 10 is formed by using a focus ion beam (FIB). Specifically, the position of the end portion 5a of the Au electrode portion 5 is determined through image recognition, and a recess portion processing box 11 is disposed on the basis of the position thus determined. Thereafter, a predetermined Dose amount of Ga ion beam is irradiated to the position of the recess portion processing box 11 with an acceleration voltage of 50 kV. At this time, the positional relationship between the end portion 5a of the Au electrode portion 5 and the processing box 11 is set so that the positional displacement between the reading track width and the writing track width is equal to zero. Further, the remaining width of the magnetic pole 8 which corresponds to the width of the writing track is set to 0.5 μm, and the depth of the recess portion 10 is set to 1 μm.

Subsequently, an $Al_2O_3$ film is formed at a thickness of 2 μm on the medium-confronting surface by the sputtering method to bury the recess portion 10 formed by the FIB. At this time, the filling rate of the $Al_2O_3$ film in the recess portion 10 is enhanced applying the substrate bias. Subsequently, the medium-confronting surface of the bar is polished (pole-height polishing) again. The re-polishing amount is set to 0.5 μm, and consequently the depth of the recess portion 10 is equal to 0.5 μm. Finally, the bar is processed/cut in a predetermined slider shape, and then subjected to an assembly step for joining to a suspension and, thereby completing the manufacturing process of the magnetoresistive head.

COMPARATIVE EXAMPLE 1

A magnetoresistive/inductive composite head in which a recess portion for defining the width of the writing magnetic pole 8 is formed on the basis of the writing magnetic pole 8 itself is manufactured for the comparison with the magnetoresistive/inductive composite head of the above embodiment. The other steps are the same as those of the above embodiment. The positional relationship between the reading track position and the writing track position, that is, the positional displacement therebetween is estimated for the magnetoresistive/inductive composite head thus manufactured. In the magnetoresistive/inductive composite head of the present invention, the three-times value of the standard deviation σ of the dispersion to a target positional displacement is equal to 0.08 μm. On the other hand, in the magnetoresistive/inductive composite head of the comparison example 1, it is equal to 0.3 μm. Therefore, it is apparent that the positioning precision of the present invention is remarkably enhanced. This difference may occur by the following reason. That is, in the present invention, the positioning precision of the processing step is mainly dependent on only the precision of the FIB processing step.

However, in the comparison example 1, the positioning precision is dependent on not only the precision of the FIB processing step, but also the displacement between the reading track position and the writing track position in the wafer step. As a result, a higher manufacturing yield is achieved in the method of manufacturing the magnetoresistive/inductive composite head of the present invention.

COMPARATIVE EXAMPLE 2

A magnetoresistive/inductive composite head in which a Cu film is used as the material constituting the electrode portion 5 for supplying sense current to the magnetoresistive element is manufactured for the comparison with the magnetoresistive/inductive composite head of the above embodiment. The other steps are the same as those of the above embodiment. The positional relationship between the reading track position and the writing track position, that is, the positional displacement therebetween is estimated for the magnetoresistive/inductive composite head thus manufactured. In the magnetoresistive/inductive composite head of the present invention, the three-times value of the standard deviation a of the dispersion to a target positional displacement is equal to 0.08 μm. On the other hand, in the magnetoresistive/inductive composite head of the comparison example 2, it is equal to 0.35 μm. Therefore, it is apparent that the positioning precision of the present invention is remarkably enhanced. This difference may occur by the following reason. That is, in the present invention, the Au film is used as the material constituting the electrode portion 5 for supplying sense current to the magnetoresistive element, and thus the intensity of the image recognition signal of the reading track position is larger than that when the Cu film is used in the comparative example 2, so that the reading track position can be recognized with higher precision. As a result, a higher manufacturing yield is achieved in the method of manufacturing the magnetoresistive/inductive composite head of the present invention.

From the comparison result between the embodiment and the comparative examples, it is apparent that when the recess portion 10 for defining the width of the writing magnetic pole 8 is formed, the recess portion 10 is formed on the basis of the end portion 5a of the electrode portion 5 and the electrode portion 5 is formed of an Au film, whereby the positional relationship between the reading track position and the writing track position can be regulated with high precision. The same effect can be achieved by using Pt, W or Ta as the material of the electrode portion 5 in place of Au.

Figure 7:
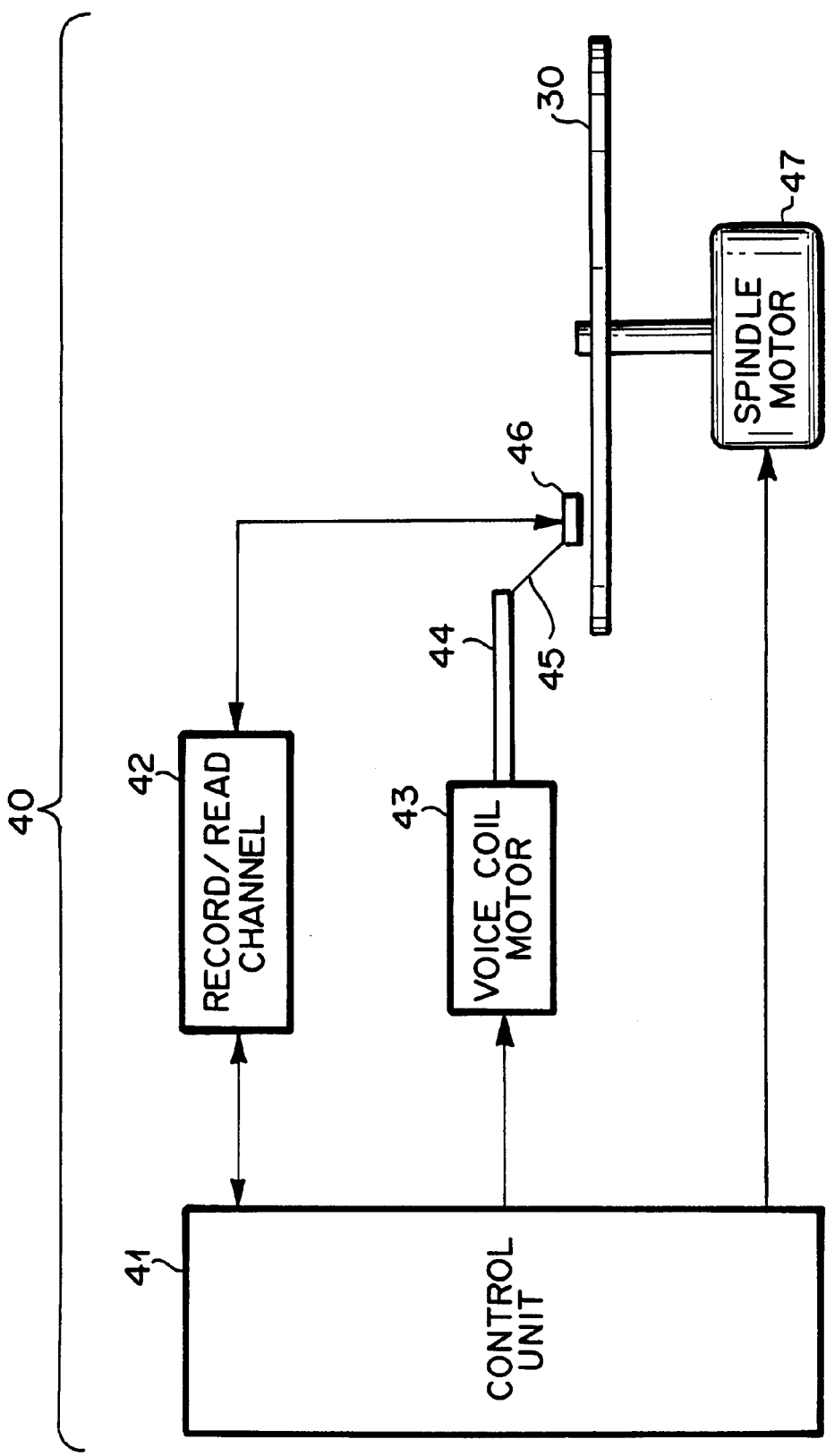
FIG. 7 is a diagram showing the construction of the magnetic disk device which the magnetoresistive/inductive composite head of the present invention is used.

Next, the construction of the magnetic disk device in which the magnetoresistive/inductive composite head of the present invention is used will be described with reference to FIG. 7.

Magnetoresistive/inductive composite head 46 is arranged above magnetic recording medium 30, and the magnetic recording medium 30 is turned by spindle motor 47. The magnetoresistive/inductive composite head 46 is suspended by arm 44 and suspension 45, and the arm 44 is controlled by voice coil motor 43.

Control unit 41 controls the spindle motor 47 and the voice coil motor 43. Further, the control unit 41 controls reading and writing operations of the magnetoresistive/inductive composite head 46 through record/read channel circuit 42.

According to the method of manufacturing the magnetoresistive/inductive composite head of the present invention, the side fringe magnetic field in the writing operation can be reduced, and the positional relationship between the writing track position and the reading track position can be strictly managed particularly even under the narrow-width condition that the writing width is equal to 1 µm or less, and thus the yield can be remarkably enhanced.

What is claimed is:

1. A method of manufacturing a magnetoresistive/inductive composite head comprising the steps:

forming a magnetoresistive head which comprises a magnetoresistive element for sensing magnetic field occurring above a magnetic recording medium and an electrode portion for supplying sense current to said magnetoresistive element, said sense current to said magnetoresistive element and said electrode portion being disposed between a pair of first and second magnetic shields disposed so as to confront each other through magnetic gaps;

forming an inductive head which comprises a first magnetic pole using said second magnetic shield as a magnetic pole, a second magnetic pole disposed at the opposite side to said magnetoresistive element with respect to said second magnetic shield and an coil for exciting said first magnetic pole and said second magnetic pole, wherein the writing of information is performed on said magnetic recording medium by magnetic field occurring from a writing magnetic gap provided between said first magnetic pole and said second magnetic pole; and forming a recess portion for defining the width of each of said first magnetic pole and said second magnetic pole on the surface of said second magnetic shield which confronts said magnetic recording medium, wherein said recess portion is formed based on a location of an end portion of said electrode portion.

2. The method as claimed in claim 1, wherein said electrode portion is formed of any material selected from the group consisting of Au, Pt, W and Ta.

3. The method as claimed in claim 1, wherein a step of forming said electrode portion contains a step of carrying out lift-off after a sputtering film formation step using a photoresist mask, said sputtering film formation step using a sputtering method having a high directivity of sputtering particles.

4. The method as claimed in claim 3, wherein an ion beam sputtering is used in said sputtering film formation step for forming said electrode portion.

5. The method as claimed in claim 1, wherein said recess portion is formed and thereafter is filled with a non-magnetic material and then, the surface of the non-magnetic material filled is polished in a predetermined shape.

6. The method as claimed in claim 1, wherein said recess portion is formed so that the width of each of said first and second magnetic poles is equal or below 1 µm.

7. The method as claimed in claim 1, wherein said recess portion is formed by using a focus ion beam.

8. A method of manufacturing a magnetoresistive/inductive composite head comprising:

forming a magnetoresistive head having a first magnetic shield, a magnetoresistive element, an electrode portion having an end portion above said magnetoresistive element, and a second magnetic shield; and forming an inductive head having a first magnetic pole on said magnetoresistive head, said forming an inductive head comprising:

determining a location of said end portion of said electrode portion using image recognition; and positioning a recess portion processing box based on said location; and irradiating said recess portion processing box with a focus ion beam (FIB) to shape said first magnetic pole, form a recess portion in said second magnetic shield on each side of said first magnetic pole, and form a second magnetic pole in said second magnetic shield beneath said first magnetic pole.

9. The method as claimed in claim 8, wherein said forming a magnetoresistive head comprises:

forming said first magnetic shield;

forming a first film on said first magnetic shield to serve as a first reading gap;

forming a spin valve laminate layer on said first film and patterning said spin valve laminate layer to form said magnetoresistive element;

forming a bias magnetic field applying portion on each side of said magnetoresistive element;

forming said electrode portion partly on said magnetoresistive element and partly on said bias magnetic field applying portion, said electrode portion comprising one of Au, Pt, W and Ta, and being formed by an ion beam sputtering method, and having a gap above said magnetoresistive element;

forming a second film to serve as a second reading gap on said electrode portion and said magnetoresistive element; and forming said second magnetic shield on said second reading gap.

10. The method as claimed in claim 9, wherein said forming an inductive head on said magnetoresistive head further comprises:

forming a writing gap on said second magnetic shield; and forming said first magnetic pole on said writing gap.

11. The method as claimed in claim 10, wherein said recess portion has a depth of 0.5 µm.

12. The method as claimed in claim 10, wherein a width of said first magnetic pole and a width of said second magnetic pole are each 1 µm or less.

13. The method as claimed in claim 10, wherein a positional displacement between a reading track width and a writing track width is zero.

14. The method as claimed in claim 10, wherein said electrode portion comprises one of Au, Pt, W and Ta,

* * * * *